United States Patent Office 3,067,098
Patented Dec. 4, 1962

3,067,098
INTRAVENOUS NOURISHMENT OF PATIENTS
William O. Pool, Glendale, Calif., assignor to Don Baxter, Inc., Glendale, Calif., a corporation of Nevada
No Drawing. Filed Nov. 2, 1959, Ser. No. 850,044
7 Claims. (Cl. 167—58)

This invention relates to a method of providing calories to patients, and particularly to those patients who are unable to take food by mouth and who are suffering from caloric deficiency, anuria, or hyperpotassemia. The invention further relates to a high calorie solution for intravenous administration to such patients.

Major nutritional problems are seen in many surgical patients who have lost a large amount of weight preoperatively, and in patients who have protracted convalescence because of bowel obstruction, peritonitis, or fistulae. Caloric and protein intakes sufficient for maintenance may be inadequate for these patients because they need to synthesize protein tissue to replace what has been lost. When a patient is deprived of the use of his gastrointestinal tract, it is often very difficult to provide him with an adequate caloric intake. In the absence of an exogenous source of calories, the patient meets his caloric needs by catabolism of endogenous fat and protein tissues. The use of fat tissues, especially in the absence of adequate carbohydrate, may result in ketosis due to incomplete oxidation of the fat. Destruction of protein tissues produces large quantities of toxic by-products. At the same time, the liver is particularly vulnerable to poisoning by such products because of its low glycogen content. Thus it is a serious problem to provide adequate calories to these patients. In fact, it is so serious that the risk of venous thrombosis is sometimes considered the lesser of evils and highly concentrated solutions are administered in a heroic effort to save life.

Anuria or other symptoms of renal inhibition are frequent post-operative complications. In acute renal failure, the mortality may be reduced if the patient is closely managed by a regime which (1) rigidly restricts fluid and electrolyte intake, (2) controls protein catabolism, (3) minimizes serum potassium rise, and (4) supports the cardiovascular system (Archives Internal Medicine 103, pp. 453–459, 1959). In cases of this type it is desirable to limit the daily fluid intake to 1000 cc., or slightly more than enough to replace the insensible losses. In this very small amount of fluid, it is desirable to provide about 1500 calories.

If the renal shutdown is not alleviated, acute uremia, accompanied by dangerously high serum potassium levels, may occur. The problem is even more serious when the patient is catabolising protein tissues to supply his basic caloric requirements, since potassium from the protein tissues accumulates very rapidly.

In many of these patients, it is customary to administer protein hydrolyzate solutions, for synthesis of tissue and for regeneration of plasma protein. It is well established that protein hydrolyzates are used for calories rather than for protein synthesis, if the caloric intake from other sources is not adequate. For example, it has been shown that with a constant nitrogen intake, the nitrogen retention increases with an increase in caloric intake (Surgery 26, pp. 374–383, 1949). In debilitated patients mere nitrogen equilibrium is not sufficient. Here it is necessary to obtain the high degree of nitrogen retention which goes with the fabrication of significant quantities of new tissue.

One promising answer to the calorie problem has been the administration of intravenous fat emulsions. However, these preparations are difficult and expensive to make, unstable when stored for long periods, and separate into fat and water layers when frozen. Also, reactions have occurred in some patients, and fat emulsions have not come into general use.

Carbohydrate solutions, such as dextrose and levulose, are often used to provide calories. Isotonic solutions of monosaccharides (5% weight/volume) are most commonly used. Concentrations as high as 10 to 20% have been injected intravenously, but they may cause serious difficulties due to venous thrombosis and thrombophlebitis. Moreover it has been impossible to provide adequate calories using a 20% solution, without seriously over-hydrating the patient in the accompanying water. For example, it has been reported (Surgery 26, p. 374, 1949) that 30 to 45 calories are needed for each kilogram of body weight in order to realize any degree of protein restitution and weight gain. Thus in an average 70 kilogram human 2100 to 3100 calories, or 2.9 to 4.3 liters of the 20% dextrose solution, are needed. This is entirely too much water to administer to most patients. If the patient's renal activity is inhibited, over-hydration of the tissues is almost certain, and circulatory failure may occur. If the patient is already malnourished, an even higher caloric intake is desirable.

In an effort to increase the available calories, a solution of 25% dextrose (monohydrate) and 5% alcohol has been used (Annals of Surgery 135, pp. 234–238, 1952). This solution contained about 1300 calories per liter so that 1.5 liters would supply the minimum needed to spare protein. In some cases even this amount of water is undesirable. In other cases, the alcohol may be undesirable because of liver damage or because of its sedative effects. Also, some venous thrombosis occurred with this solution and it has now been withdrawn from the market.

Forty and fifty percent solutions of invert sugar and glucose have been used to provide calories, particularly during renal failure (California Medicine 89, p. 261, October 1958). These solutions were administered through a cannula which was passed through a peripheral vein into a large vein, such as the vena cava. This technique has not been widely used because of the inconvenience of inserting the catheter, the possibility of irritation by the catheter and the risk of serious thrombosis in the vena cava (Lancet 1, p. 15, 1959). Since these solutions have also been used as sclerosing agents to deliberately close off peripheral varicose veins, their irritant properties are well known.

It is therefore an object of this invention to provide a method of administering adequate calories to patients having caloric deficiencies, while preventing any serious inflammation as an incident or consequence of the administration.

Another object of the invention is to provide a method for providing calories to patients having anuria, hyperpotassemia, edema or cardiac decompensation.

Another object is to provide a method of supplying calories intravenously to patients, while at the same time administering a minimum of water.

A further object is to provide a method for reducing the blood potassium levels of patients having hyperpotassemia.

A still further object is to provide a high calorie solution suitable for intravenous administration into a peripheral vein of a patient.

I have found that a solution containing 32% or more of a monosaccharide can be administered into the peripheral veins of a patient, if the solution contains a small amount of an anti-inflammatory steroid hormone. The monosaccharide is preferably selected from the class consisting of dextrose, levulose, and mixtures thereof. To provide adequate calories, the monosaccharide concentration should be at least 32% (weight/volume) and it may approach the solubility limit. Thus solutions of anhydrous dextrose containing from 32% to 54% (weight/volume) are within the scope of the invention. It would not usually be necessary or desirable to use levulose solutions stronger than 60%. Five hundred milliliters of dextrose solution would then contain from 160 to 270 grams of dextrose or 640 to 1080 calories, and from 400 to 330 milliliters of water. Five hundred milliliters of levulose solution would contain from 160 to 300 grams of levulose of 640 to 1200 calories, and from 400 to 310 milliliters of water.

Injection of the monosaccharide in the concentration contemplated, may tend to create inflammation at the locus of administration, and while if not prevented, could result in thrombophlebitis productive of localized irritations and swelling. Thrombophlebitis is a type of venous thrombosis in which there is a marked inflammatory reaction in the wall of the effected vein. When this reaction accurs in a superficial vein, the thrombosed vein may be palpated as a linear indurated cord. The inflammatory reaction will also cause the area to be painful, tender, erythematous and warm.

Accordingly, the invention particularly contemplates precluding such localized inflammation, without giving a systemic effect, by including in the monosaccharide solution a suitable stable, water soluble steroid.

The anti-inflammatory steroid is preferably selected from the class consisting of hydrocortisone, cortisone, prednisolone, and prednisone, and the anti-inflammatory derivatives thereof, all of which are alcoholic in that they contain $CH_2OH$ groups and can be esterified. The particular anti-inflammatory agent used must, of course, be soluble, stable in aqueous solutions of the appropriate pH, and nonreactive with dextrose. Either the free alcohols or the therapeutically active esters may be used. For example, the esters include the 21-esters of acetic acid, propionic acid, monochloroacetic acid, dichloroacetic acid, trichloroacetic acid, and succinic acid.

When hydrocortisone is used as the anti-inflammatory steroid, the amount used is preferably between 2 and 15 milligrams per 500 milliliters of solution. Such an amount will exert an adequate local effect without exerting a systemic effect. Hydrocortisone occurs naturally in the body, and the amount administered in the method of this invention is comparable to that produced by the normal adrenal gland in a 24-hour period.

Prednisone and prednisolone are analogs of cortisone and hydrocortisone respectively. They differ from the latter by having an additional double bond between carbons 1 and 2, in the delta 1 position. Their actions are very similar to those of cortisone and hydrocortisone, but they are three to five times more potent therapeutically. Thus, when prednisone or prednisolone are used as the anti-inflammatory steroid of this invention, the amount used is preferably between about 0.5 and 4 milligrams per 500 milliliters of solution. As other more potent anti-inflammatory steroids become available, it is anticipated that they too may be used in the solution of this invention. Once the therapeutic potency of the new steroid is established with relation to hydrocortisone, the proper amount of steroid to try in a concentrated monosaccharide solution can be calculated. In general this should result in a satisfactory solution, but some adjustment of the steroid concentration may be necessary because the therapeutic potency varies somewhat with the symptom being treated.

By administering a solution containing at least 32%, and preferably about 50% dextrose and an anti-inflammatory steroid to a patient having hyperpotassemia, a relatively large amount of dextrose is supplied to the patient without a dangerous amount of water. Some of this dextrose is converted to glycogen and stored in the liver. The storage of glycogen aids in removing potassium from the extracellular fluid, and thus alleviating the hyperpotassemic condition.

In malnourished patients whose serum potassium level is normal and whose renal function is not inhibited, the monosaccharide solution should contain from 10 to 24 milliequivalents of potassium, in the form of potassium phosphate, per 100 grams om monosaccharide (i.e. from 25 to 60 milliequivalents per 500 cc. bottle of 50% dextrose).

If the solution is to be heat sterilized, the pH of the potassium phosphate is preferably adjusted to between 4.0 and 4.5 to minimize caramelization of the monosaccharide. If the solution is to be filter sterilized, or the potassium phosphate is to be added to the solution just prior to use, the pH of the potassium phosphate may be adjusted to between 6.5 and 7.4. Since the potassium phosphate is a relatively strong buffer, the latter solution is preferred for any patient having a tendency towards acidosis. In some patients, potassium chloride may be used in place of potassium phosphate. In this case the potassium chloride solution preferably has a pH of 4.0–4.5.

If the patient requires prolonged treatment or has any tendency toward diabetes, the solution should also contain 8 to 20 units of insulin per 100 grams of monosaccharide (i.e. 20–50 units per 500 cc. bottle of 50% dextrose). The insulin helps reduce the blood sugar level, assists storage of glycogen in liver and muscle tissue, and helps prevent excessive protein breakdown. Although the body produces considerable insulin, it is obviously undesirable to risk overloading and possible damage to the pancreas.

These concentrated monosaccharide solutions are preferably administered slowly so as not to overload the patient's system. Preferably the rate of administration should be about 0.8 gram of monosaccharide per kilogram of body weight per hour. In a 160 pound man (73 kilograms), this would allow administration of 500 cc. of 48% dextrose with hydrocortisone solution in four to five hours.

If it is necessary to further limit the patient's intake of water, concentrated solutions of hydrolyzed protein are desirable. I have found that hydrolyzed protein solutions having concentrations of 10 to 20% (weight/volume) can be administered through the peripheral veins of a patient without serious irritation if the solution also contains 2 to 15 milligrams of hydrocortisone or its equivalent per 500 milliliters of solution. Previously, concentrated protein hydrolyzates have been quite irritating to the veins because of their concentration and also because of the relatively high titratable acidity.

The following examples are given by way of illustration:

*Example 1*

Dextrose _____grams__ 240
Hydrocortisone _____milligrams__ 5
Water for injection, to make 500 milliliters.

To prepare the above solution, the hydrocortisone is weighed out and dissolved in ethyl alcohol to make a solution of approximately 1%. Dextrose is weighed out and dissolved in water. A calculated amount of the 1% hydrocortisone solution is then added to the dextrose solution and water added to make the final desired volume. After thorough mixing, the solution is filled into 500 milliliter bottles, a vacuum drawn on the bottles, and the bottles sealed. The sealed bottles are then sterilized by steam under pressure.

The resulting solution has a pH of about 4.0 and provides 960 potential calories in each 500 milliliters of solution. Over two hundred bottles of this solution have been administered to eighty-three patients. In most cases, the solution was administered through the antecubital veins. There were no systemic reactions and only nine reports of venous thrombosis or thrombophlebitis. Seven of the reported cases of thrombosis or thrombophlebitis were associated with an administration rate considerably exceeding 0.8 gram per kilogram of body weight per hour. The other two cases, developed thrombosis only after very prolonged infusions.

Example 2

Dextrose _____grams__ 200
Ethyl alcohol, U.S.P. _____milliliters__ 25
Prednisone _____milligram__ 1
Water for injection, to make 500 milliliters.

The above solution is prepared in a manner similar to that described in Example 1. This solution should be administered only to patients who are not suffering from liver damage and in whom the sedative effects of the alcohol are not objectionable.

Example 3

Dextrose _____grams__ 270
Hydrocortisone 21-hemisuccinate ____milligrams__ 13
  (equivalent to 10 milligrams of hydrocortisone)
Potassium phosphate, dibasic _____grams__ 5.18
Potassium phosphate, monobasic _____do____ 1.04
  (equivalent to 60 milliequivalents or 22 milliequivalents per 100 grams of dextrose)
Insulin _____units__ 28
Water for injection, to make 500 milliliters.

The levulose, hydrocortisone hemisuccinate, insulin, and the potassium phosphate are dissolved in water, and the solution diluted to the final desired volume and thoroughly mixed. The solution is then sterilized by filtering through a Seitz or Berkfeld filter into sterile 500 cc. bottles and the bottles sealed.

Example 4

Invert sugar _____grams__ 300
Cortisone acetate _____milligrams__ 7
  (equivalent to 5 milligrams of hydrocortisone)
Potassium chloride _____grams__ 4.9
  (equivalent to 66 milliequivalents or 22 milliequivalents per 100 grams of monosaccharide)
Water for injection, to make 500 milliliters.

This solution is prepared in a manner similar to that described in Example 1. The invert sugar used should have a pH of 4.0 to 4.5.

Example 5

Levulose _____grams__ 200
Hydrocortisone _____milligrams__ 7
Potassium phosphate, monobasic _____grams__ 8.9
  (equivalent to 66 milliequivalents or 16.5 milliequivalents per 100 grams of monosaccharide)
Water for injection, to make 500 milliliters.

This solution is prepared in a manner similar to that described in Example 1. Its pH should be 4.0 to 4.5.

Example 6

Dextrose _____grams__ 230
Prednisolone _____milligrams__ 5
Potassium chloride _____grams__ 1.8
  (24 milliequivalents or 10 milliequivalents per 100 grams of dextrose)
Thiamin Hydrochloride, U.S.P. _____milligrams__ 15
Riboflavin, U.S.P. _____do____ 10
Nicotinamide, U.S.P. _____do____ 100
Water for injection, to make 500 milliliters.

This solution is also prepared by a method similar to that described in Example 1.

Example 7

Solution "A":
  Levulose _____grams__ 300
  Hydrocortisone _____milligrams__ 5
  Water for injection, to make 500 milliliters.
Solution "B":
  Potassium phosphate, monobasic ____gram__ 0.46
  Potassium phosphate, dibasic _____grams__ 2.31
    (30 milliequivalents or 10 milliequivalents per 100 grams of levulose)
  Insulin _____units__ 65
  Water for injection, to make 20 milliliters.

Solution "A" is prepared and sterilized by the procedure described in Example 1. Solution "B" is prepared by dissolving the ingredients in water, diluting to the final desired volume, and filtering the solution through a Seitz filter into suitable sterile vials. Solution "B" is then added to Solution "A" just prior to administration to a patient. The mixed solution has a pH of approximately 7.4.

Example 8

Hydrolyzed casein _____grams__ 100
Hydrocortisone _____milligrams__ 5
Water for injection, to make 500 milliliters.

This solution is particularly useful in conjunction with the solution of Example 1 for treating malnourished patients. For example, a patient may receive the following in sequential administrations:

500 milliliters of 48% dextrose solution (Example 1)
1000 milliliters of 20% hydrolyzed casein solution (Example 8)
500 milliliters of 48% dextrose solution (Example 1)

Thus in a period of about 15 hours, a patient would receive approximately 1900 calories of carbohydrate plus 200 grams of protein in a total volume of only 2000 milliliters. This represents practically a full supply of calories and amino acids for one day.

The solutions described in the examples are easily prepared and are stable at room temperature for long periods of time. The solutions may be frozen without serious damage and are easily melted. In fact the high percentage of monosaccharide usually prevents the solution from freezing hard thus preventing breakage of the containers.

The solutions contain large amounts of calories in a readily usable form. There is very little loss of monosaccharide in the urine and no undesirable changes have been detected in the blood pressure, temperature, pulse rate, or respiration of patients receiving the solutions.

The foregoing examples are given by way of illustration only. It should be understood that numerous changes and modifications may be made in the examples without departing from the spirit of the invention.

I claim:

1. A method of providing calories to a human patient comprising: the step of slowly injecting into a vein of said patient at least 500 milliliters of an aqueous solution containing at least 160 grams of a monosaccharide selected from the class consisting of dextrose, levulose, and mixtures thereof, and simultaneously suppressing inflammation of the vein near the site of administration by including in each 500 milliliters of said solution a stable, water-soluble steroid selected from the class consisting of 2 to 15 milligrams of hydrocortisone, 2 to 15 milligrams of cortisone, 0.5 to 4 milligrams of prednisolone, and 0.5 to 4 milligrams of prednisone.

2. A method of providing calories to a human patient comprising: the step of slowly injecting into a vein of said patient at least 500 milliliters of an aqueous solution containing at least 160 grams of a monosaccharide selected from the class consisting of dextrose, levulose, and mixtures thereof, and simultaneously suppressing venous thrombosis and thrombophlebitis near the site of administration by including in each 500 milliliters of said solution from 2 to 15 milligrams of hydrocortisone.

3. A method of providing calories to a human patient comprising: within a continuous twenty-four hour period slowly injecting into a peripheral vein of said patient at least 500 milliliters of an aqueous solution containing at least 160 grams of a monosaccharide selected from the class consisting of dextrose, levulose, and mixtures thereof, and simultaneously suppressing inflammation of the vein near the site of administration by including hydrocortisone in said solution in an amount of from 2 to 15 milligrams per 500 milliliters of solution, whereby the incidence and severity of thrombophlebitis is reduced.

4. A method of providing calories to a patient comprising: slowly injecting approximately 500 milliliters of an aqueous solution containing approximately 240 grams of dextrose into a peripheral vein of a patient, and simultaneously suppressing local inflammation and thrombosis at the site of injection by including in said solution approximately 5 milligrams of hydrocortisone.

5. A method of nourishing a patient intravenously comprising: within a twenty-four hour period, intravenously injecting slowly into said patient a liter of solution containing at least 320 grams of a monosaccharide and a liter of a second solution containing 200 grams of hydrolyzed protein, and simultaneously suppressing inflammation of the vein near the site of administration by including in each of said solutions from 4 to 30 milligrams of hydrocortisone, thus effectively supplying the patient with at least 1280 calories plus 200 grams of hydrolyzed protein.

6. A method of nourishing a patient intraveneously comprising: the step of slowly injecting into a vein of said patient at least 500 milliliters of an aqueous solution containing at least 100 grams of hydrolyzed protein and simultaneously suppressing inflammation of the vein near the site of administration by including in each 500 milliliters of said solution from 2 to 15 milligrams of hydrocortisone.

7. An injectable therapeutic composition comprising: an aqueous solution of at least 10% of a hydrolyzed casein solution and from 0.0004% to 0.003% hydrocortisone, whereby the incidence and severity of local inflammation and thrombosis at the site of injection will be suppressed when the solution is injected into a vein of a patient.

References Cited in the file of this patent

Medici: J.A.M.A., 161:1, page 106, May 5, 1956.
Polarimetry, Saccharimetry and the Sugars, NBS Circular C440, page 363, May 1, 1942.
Unlisted Drugs 3:2, February 28, 1951, page 12, entry (a).
Carter et al.: Calif. Med., vol. 89, pp. 260–261, October 1958.
Cornbleet: JAMA, 156:13, p. 1274, November 27, 1954.